United States Patent [19]

Kimoto et al.

[11] Patent Number: 5,015,280
[45] Date of Patent: May 14, 1991

[54] MOLD FOR MOLDING OPTICAL ELEMENTS

[75] Inventors: Takayuki Kimoto, Neyagawa; Masaaki Sunohara, Nishinomiya; Takashi Inoue, Hirakata; Shoji Nakamura, Hirakata; Daijirou Yonetani, Hirakata, all of Japan

[73] Assignee: Matsushita Electric Industrial Co., Ltd., Osaka, Japan

[21] Appl. No.: 396,621

[22] Filed: Aug. 22, 1989

[30] Foreign Application Priority Data

Aug. 22, 1988 [JP] Japan .................................. 63-207636
Oct. 19, 1988 [JP] Japan .................................. 63-263229

[51] Int. Cl.$^5$ ............................................. C03B 11/08
[52] U.S. Cl. ........................................... 65/307; 65/37; 65/355; 249/67; 249/111; 425/416; 425/808
[58] Field of Search .................. 65/307, 355, 356, 323, 65/374.11, 374.12, 374.13, 268, 37,39; 249/111, 67; 425/416, 808

[56] References Cited

U.S. PATENT DOCUMENTS

| | | | |
|---|---|---|---|
| 2,059,767 | 11/1936 | Bausch | 65/39 |
| 3,887,350 | 6/1975 | Jenkins | 65/356 X |
| 4,481,023 | 11/1984 | Marechal et al. | 65/64 |
| 4,629,489 | 12/1986 | Hirota et al. | 65/102 |
| 4,738,703 | 4/1988 | Izumitani et al. | 65/64 |

FOREIGN PATENT DOCUMENTS

| | | |
|---|---|---|
| 1429343 | 3/1976 | Fed. Rep. of Germany . |
| 56-378 | 1/1981 | Japan . |
| 61-26528 | 2/1986 | Japan . |
| 61-53126 | 3/1986 | Japan . |
| 61-53126 | 3/1986 | Japan . |
| 63-45137 | 2/1988 | Japan .................................. 65/37 |
| 63-170229 | 7/1988 | Japan .................................. 65/37 |

Primary Examiner—Robert L. Lindsay
Attorney, Agent, or Firm—Wenderoth, Lind & Ponack

[57] ABSTRACT

A mold arranged between a pair of heater blocks for molding an optical element comprises a pair of first and second elements each having a molding surface for defining a cavity and an outer surface opposite to the molding surface and in contact with a corresponding heater block, and a ring member for guiding the first and second elements. The rear surface of at least one of the first and second elements has a part which is not in contact with the corresponding heater block. Also, another mold comprises a pair of first and second elements each having a molding surface for defining a cavity and an outer surface opposite to the molding surface, a first ring member for guiding the first and second elements, and a second outer ring member made of a material with a lower thermal conductivity than that of the first ring member. A molding method for optical elements is such that a glass with a viscosity of $10^{12}$ poise or more is fed to a mold with a temperature at or below the glass transition point, heated to a temperature corresponding to the glass viscosity of $10^8$ to $10^{10}$ poise and pressed for 3 to 90 seconds. The glass is then cooled at a rate of 1.5° to 2.5° C./sec to a viscosity of $10^{10}$ to $10^{11}$ poise and thereafter at a rate of 0.2° to 1.5° C./sec with the glass pressurized, and removed as an optical element at or below the glass transition point.

9 Claims, 9 Drawing Sheets

MOLD FOR MOLDING OPTICAL ELEMENTS

BACKGROUND OF THE INVENTION

1. Field of the Invention

The present invention relates to a mold used mainly for press molding of a highly precise optical element and a method for molding optical elements.

2. Description of the Prior Art

Recently, optical elements have tended to have a nonspherical surface with which both simplification of lens configuration and weight reduction of the lens part in an optical apparatus can be simultaneously achieved. U.S. Pat. No. 4,481,023 proposes a method of manufacturing a highly precise glass product with a low cost, by which a highly precise optical glass element can be obtained by shortening the time required for a pressurization cycle. The method proposed is outlined as follows. Using a glass preform having a shape similar to its final product, a mold and the glass preform are heated separately from each other, a pressing operation is initiated at a temperature corresponding to a glass viscosity of $10^8$ poise or more and $10^{12}$ poise or less, respectively, for glass and metal molds, and the pressing operation is finished at a temperature corresponding to a glass viscosity less than $10^{13}$ poise. Then the glass is taken out.

Japanese Patent Publication No. 56-378/1981 discloses a molding method for molding a raw lens material in which the temperature of a mold is kept at a value equal to or greater than the transition point and the softening point of a molded glass, a glass having flow properties is poured into the mold to be press molded. This condition is held for 20 seconds or more until the temperature distribution of the glass becomes uniform.

However, in the prior art examples mentioned above, a glass and a mold have been separately heated and then the glass has been supplied to inside the mold to be press molded, so that in the course of press molding the temperature is very liable to be non-uniform, requiring the press to be held for a certain time. Since a heating section is provided on the entire peripheral portion of the mold, rapid cooling is impossible. Accordingly, this has negatively affected cycle time, with the result that a low-cost lens cannot be manufactured.

As disclosed in Japanese Patent laid open application No. 61-26528/1986, a method has been known by which, after press molding, cooling is performed by using many molds and sequentially transferring them to a temperature-decline type slow cooling chamber. Also, the cooling rate after press molding is a very important parameter which affects lens performance. Japanese Patent laid open application No. 61-53126/1986 discloses a cooling at a constant rate of 0.9° C./sec. or less without pressurization.

Thus, the temperature control from press molding to cooling has been known to be important in order to obtain a highly precise transferred surface. Slowing the cooling rate causes cycle time to become long, making difficult the supply of a low-cost optical element. Also, an optical element with a substantially different wall thickness between its center portion and peripheral portion is liable to develop a temperature difference, making it difficult to obtain a desired lens performance.

Further, U.S. Pat. No. 2,292,917 discloses a mold through which a thick-walled lens part is liable to cool and which uses two different materials in thermal conduction in order to make it difficult to develop a temperature difference between the center portion and the peripheral portion of an optical element. However, the mold is complex in structure, making it difficult for the mold to be located between a pair of heater blocks and transferred. Also, U.S. patent application Ser. No. 07/198,929 (filed on May 24, 1988) discloses a method by which a thin-walled lens portion is heated so as not to develop a temperature difference in the plastic inside the cavity. However, a heating section is provided on the peripheral portion of a mold, causing the cycle time to become long.

SUMMARY OF THE INVENTION

It is an object of the present invention to provide a mold and a molding method for optical elements for making it easy to reduce a temperature difference in a glass to be molded and for quickly manufacturing a highly precise and low-cost optical element.

In order to achieve the object mentioned above, a mold for molding an optical element according to the present invention, which is to be arranged between a pair of heater blocks to mold an optical element, comprises a pair of first and second elements each having a molding surface for defining a cavity and a rear or outer surface opposite to the molding surface and in contact with a corresponding heater block, and a ring member for guiding said first and said second elements, the rear surface of at least one of said first and said second elements having a non-contact part which will not be in contact with the corresponding heater block at an area near a thin portion of the optical element.

With the configuration mentioned above, the rear or outer surface of the mold near a thin portion of the optical element to be molded has a non-contact part which is not in contact with the corresponding heater block in each stage, so that thermal conduction is inhibited at the non-contact part. This arrangement inhibits the development of a temperature difference in the glass. When there are different curvatures, the internal portion of the glass on the mold side which has a smaller curvature is liable to develop a temperature different than the outer portions of the glass. Accordingly, a positive effect can be more easily obtained by providing the mold with a non-contact part which is not in contact with the heater block.

Also, another mold for molding an optical element comprises a pair of first and second elements each having a molding surface for defining a cavity, a first ring member for guiding the first and the second elements, and a second ring member, made of a material with a lower thermal conductivity than that of the first ring member, disposed to the outside of the first ring member.

With this configuration, the mold has the second ring member made of a material with a lower thermal conductivity than that of the first ring member and disposed on the outside of the first ring member. The second ring member prevents heat from escaping from the peripheral portion of an optical element and temperature difference from developing in the glass. Preferably, a more positive effect can be obtained by providing a clearance of 3 mm or less between said first and second ring members. Further, with said second ring member made longer than said first ring member, the heater blocks come in contact with said second ring member, permitting the thickness of the optical element to be predetermined. At this time, finishing the second ring member with a high precision allows the parallelism of a lens to be predetermined. The properties to be considered in selecting the second ring member materials include superior oxidation-resistance, large compressive strength and low cost. A suitable material in which the above properties can be found is stainless steel, preferably that of austenitic base or of martensitic bas. The first ring member guides said first element and said second element. When a mold having a molding surface is inserted into the first ring member, the first molding surface and the second molding surface become perpendicular to the internal surface of the first ring member, thereby allowing the optical axes to be aligned.

A molding method for molding an optical element according to the present invention to achieve the object mentioned above is a method in which a glass with a viscosity of $10^{12}$ poise or more is supplied to a mold with a temperature at or below the transition point, is heated up to a temperature corresponding to the glass viscosity of $10^8$ to $10^{10}$ poise, is press molded for 3 to 90 seconds, and is then cooled at a cooling rate of 1.5° to 2.5° C./sec. to $10^{10}$ to $10^{11}$ poise or less with the glass pressurized. Thereafter, the glass is cooled at a cooling rate of 0.2° to 1.5° C./sec., and is then taken out as an optical element at a temperature at or below the glass transition point.

The method mentioned above allows a highly precise and low-cost optical element to be quickly manufactured. The molding method for optical elements according to the present invention is performed within a range of viscosities of $10^8$ to $10^{12.75}$ poise, so that both the glass and the mold are cooled to prevent deformations in the shape of a molded product and to prevent the development of distortions due to cooling. Also, when under a pressurized condition the cooling rate is controlled such that the temperature of the mold is the same as that of the glass in the cooling process before annealing, no change in surface accuracy is found and there is little residual distortion even though annealing is performed. On the contrary, an optical element having been molded without being processed with such cooling process cannot maintain a shape obtained before the cooling process when annealing is performed.

A press molding machine used for the molding method for optical elements is a simplified press molding machine which has no special space for replacing air with inert gas and performs no vacuum exhaust.

DESCRIPTION OF THE PREFERRED EMBODIMENTS

Referring to the drawings, molds for molding optical elements according to the present invention will be explained hereinafter.

Figure 1A:
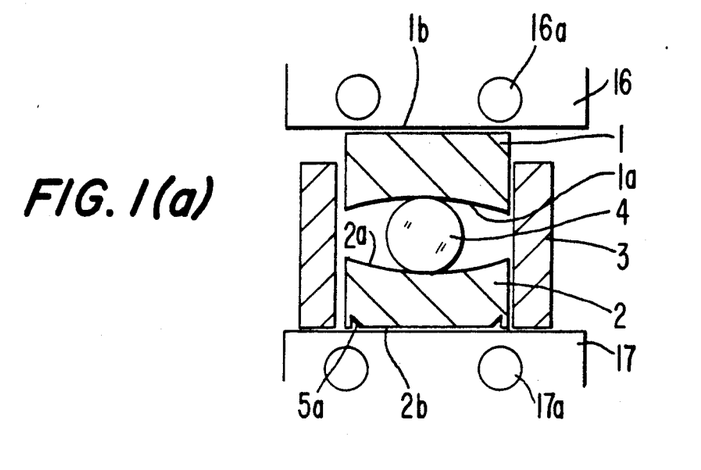
FIGS. 1(a), (b) and (c), FIGS. 2(a), (b) and (c), and FIGS. 3(a) and (b) are sectional views of models for optical elements according to the present invention.
Figure 1B:
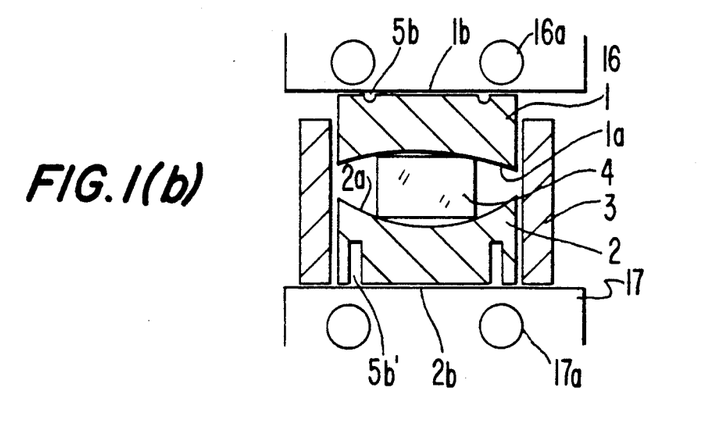
Figure 1C:
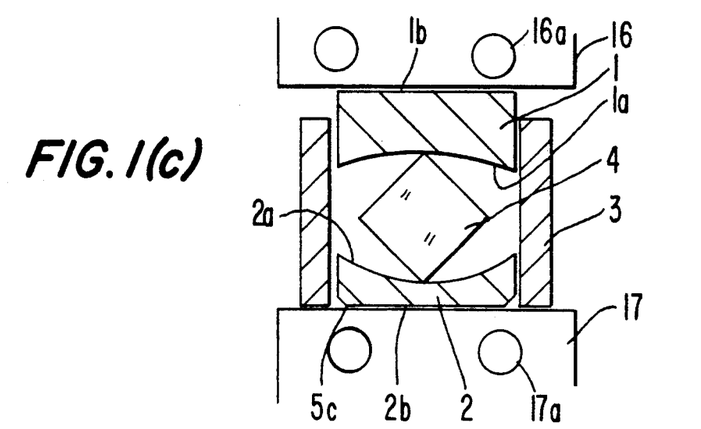

FIGS. 1(a), (b) and (c) show sectional views of molds for molding a bi-convex lens. In each drawing, an upper element 1 and a lower element 2 are arranged such that they are guided by a ring member 3. The upper element 1 has a molding surface 1a and a rear or outer surface 1b opposite to the molding surface 1a, and the lower element 2 has a molding surface 2a and a rear or outer surface 2b opposite to the molding surface 2a. The molding surfaces 1a and 2a define a cavity. The upper element 1 is in contact with an upper heater block 16 at its rear surface 1b, and the lower element 2 is in contact with a lower heater block 17 at its rear surface 2b. The upper and lower heater blocks 16 and 17 are heated by cartridge heaters 16a and 17a as heating sources, respectively. Between the upper element 1 and the lower element 2, a raw glass material 4 for a lens to be molded is held. The raw glass material 4 is heated with the heat produced by the heater blocks, and press molded with a pressure applied from either or both of the heater blocks 16 and 17.

In a cooling process after having been heated and press molded, the whole of the lens to be molded must be uniformly cooled. Accordingly, a part of the rear surface of either or both of the upper element 1 and the lower element 2 is arranged such that it is not in contact with the corresponding heater block. The part which is not in contact with the heater block corresponds to a thin portion of the lens.

In the structure shown in FIG. 1(a), the shape of the raw glass material 4 is nearly spherical. A groove 5a whose cross section is triangular is provided on a part near the outer periphery of the rear surface 2b of the lower element 2. Accordingly, the rear surface 2b of the lower element 2 is not in contact with the lower heater block 17 at the groove 5a. Since, near the non-contact part (or groove) 5a, heat is difficult to conduct to the heater block, the cooling rate at the periphery (thin portion) of the lens to be molded becomes slower than that of the center portion (thick portion). Accordingly, the lens is uniformly cooled, allowing a uniform molded lens to be obtained.

As an example, a lens has a configuration in which the radius of curvature on the upper side is 45 mm, the radius of the curvature on the lower side is 32 mm, the diameter is 30 mm, the thickness at the center portion is 7.5 mm, and the thickness at the periphery is 1.2 mm. In this case, the cross section is 3 mm deep with a triangular section located at a diameter of 24 mm corresponding to 80% of the diameter of the lower element 2 and defining the part 5a which is not in contact with the heater block 17.

In FIG. 1(b), the raw lens material 4 is cylindrical. The upper element 1 is provided with a groove 5b of semi-circular cross section at a part near the periphery of its rear surface 1b such that part of the upper element 1 is not in contact with the upper heater block 16. The lower element 2 is provided with a groove 5b' of quadrangular cross section at a part near the periphery of its rear surface, such that part of the lower element 2 is not in contact with the lower heater block 17. With the grooves 5b and 5b', the cooling at the lens periphery is inhibited, so that the lens is uniformly cooled, allowing a uniform molded lens to be obtained.

As an example, a lens has a configuration in which the radius of curvature on the upper side is 50 mm, the radius of the curvature on the lower side is 33 mm, the diameter is 30 mm, the thickness at the center portion is 7 mm, and the thickness at the periphery is 1.1 mm. In this case, the cross section is 8 mm deep with a quadrangular section located at a diameter of 24 mm corresponding to 80% of the diameter of the lower element 2 with the small radius of curvature to its inside. The groove 5b' near the periphery of the rear surface of the lower element defines the part 5b' which is not in contact with the heater block 17, and the cross section is 1 mm deep with a semicircular section located at a diameter of 21 mm corresponding to 70% of the diameter of the upper element 1.

In FIG. 1(c), the raw lens material is cubic. Near the periphery of the rear surface 2b of the lower element 2, a groove 5c whose cross section is triangular is provided and forms a non-contact part not in contact with the lower heater block 17. With the non-contact part (or groove) 5c which is not in contact with the heater block 17, the cooling of the lens periphery is inhibited, so that the lens is uniformly cooled, allowing a uniform molded lens to be obtained.

As an example, a lens has a configuration in which the radius of curvature on the upper side is 50 mm, the radius of curvature on the lower side is 33 mm, the diameter is 30 mm, the thickness at the center portion is 7 mm, and the thickness at the periphery is 1.1 mm, which is the same as for the example of FIG. 1(b) and gives a larger deformation because the raw glass material 4 to be molded is cubic. Accordingly, the lower element 2 is made short, so that the part 5c not in contact with the heater block 17 is configured to form a triangular cross section.

Figure 2A:
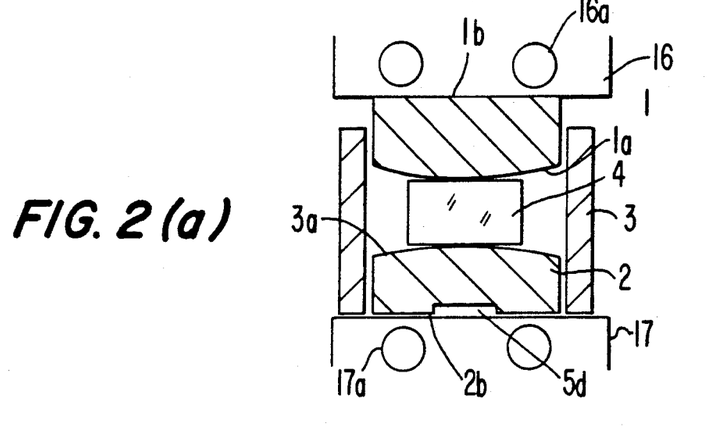
Figure 2B:
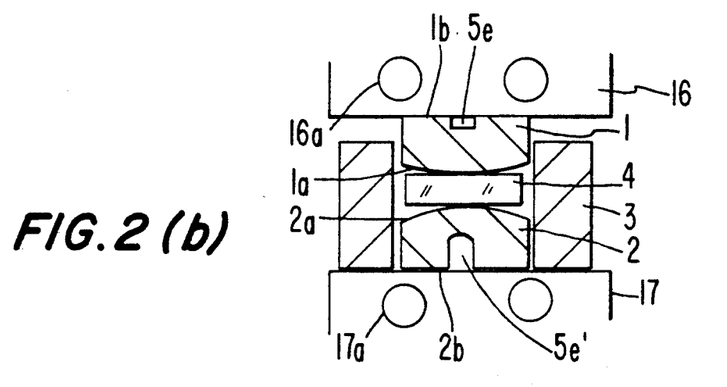
Figure 2C:
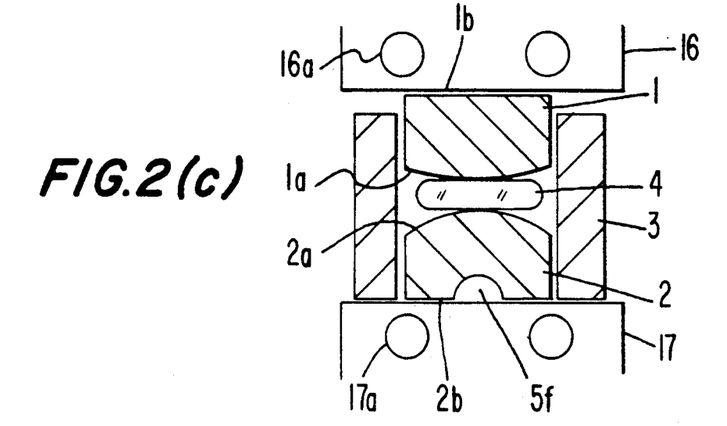

FIGS. 2(a), (b) and (c) show sectional views of molds for molding a bi-concave lens.

In the structure shown in FIG. 2(a), the shape of the raw glass material 4 is cylindrical. A groove 5d whose cross section is quadrangular is provided on the part of the lower element 2 near the center portion of the rear surface 2b thereof. Accordingly, the rear surface 2b of the lower element 2 is not in contact with the lower heater block 17 at the groove 5d. Since, near the non-contact part 5d, heat is difficult to conduct to the heater block, the cooling rate at the center portion (thin portion) of the lens to be molded becomes slower than that at the periphery (thick portion). Accordingly, the lens is uniformly cooled, allowing a uniform molded lens to be obtained.

As an example, a lens has a configuration in which the radius of curvature on the upper side is 90 mm, the radius of curvature on the lower side is 80 mm, the diameter is 25 mm, the thickness at the center portion is 3.2 mm, and the thickness at the perimeter is 5 mm. In this case, a groove 5d which is 2 mm deep and forms a part which is not in contact with the heater block 17 is defined at a diameter of 8 mm and encompasses 40% or less of the diameter of the lower element 2.

In FIG. 2(b), the raw lens material 4 is cylindrical. Near the center of the rear surface 1b of the upper element 1, a groove 5e whose cross section is quadrangular is provided, and forms a non-contact part not in contact with the upper heater block 16. Near the center of the rear surface 2b of the lower element 2, a groove 5e' whose cross section is quadrangular is also provided, and forms a non-contact part not in contact with the lower heater block 17. With the parts 5e and 5e' which are not in contact with the heater blocks, the cooling of the lens center portion is inhibited, so that the lens is uniformly cooled, allowing a uniform molded lens to be obtained.

As an example, a lens has a configuration in which the radius of curvature on the upper side is 88 mm, the radius of curvature on the lower side is 50 mm, the diameter is 15 mm, the thickness at the center portion is 1.1 mm, and the thickness at the perimeter is 2 mm. In this case, the part 5e' which is 6 mm deep is defined at a diameter of 4.5 mm corresponding to 30% of the diameter of the lower element 2, and the part 5e which is 2 mm deep is defined at a diameter of 4.5 mm corresponding to 30% of the diameter of the upper element 1.

In FIG. 2(c), the raw lens material 4 is of disc shape with a rounded periphery. Near the center of the rear surface 2b of the lower element 2, a groove 5f whose cross section is semicircular is provided, and forms a non-contact part not in contact with the heater block 17. With the part 5f which is not in contact with the heater block 17, the cooling of the lens center portion is inhibited, so that the lens is uniformly cooled, allowing a uniform molded lens to be obtained.

As an example, a lens has a configuration in which the radius of curvature on the upper side is 90 mm, the radius of curvature on the lower side is 46 mm, the diameter is 15 mm, the thickness at the center portion is 1 mm, and the thickness at the perimeter is 2 mm. The semicircular non-contact part 5f is defined at a diameter of 6 mm corresponding to 40% or less of the diameter of the lower element 2.

Referring to the drawings, another mold for optical elements according to the present invention will be explained hereinafter.

Figure 3A:
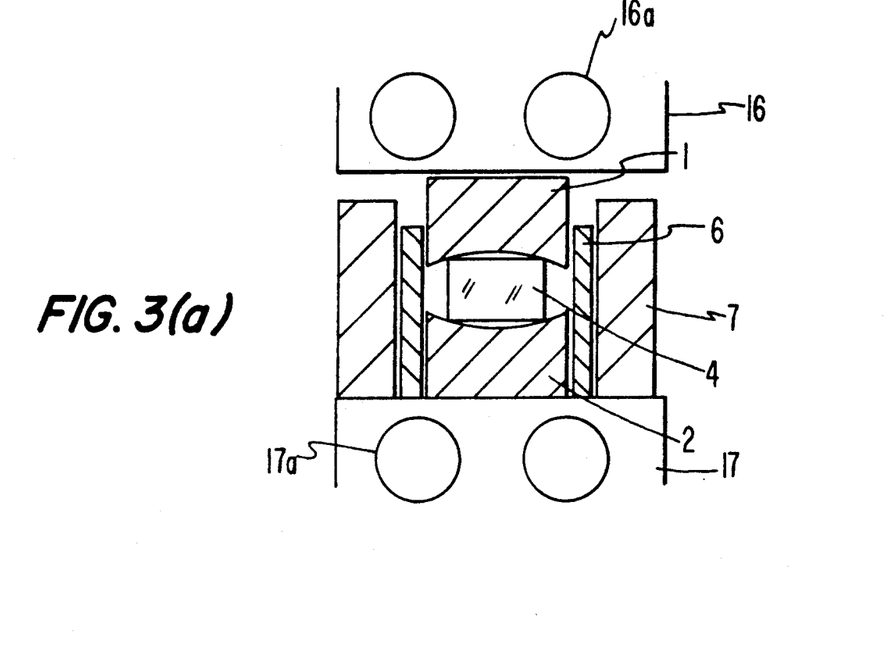
Figure 3B:
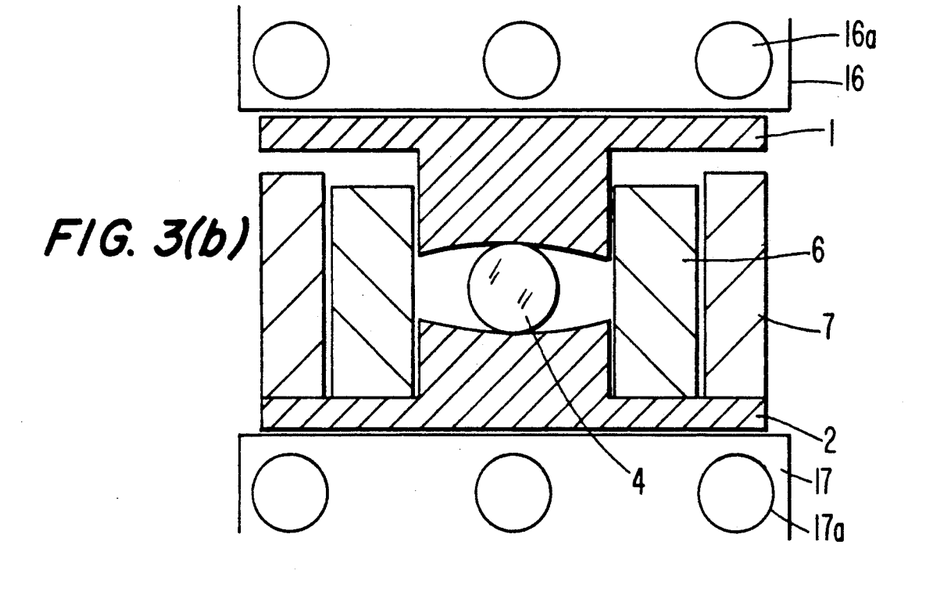

FIGS. 3(a) and (b) show sectional views of molds for molding a bi-convex lens. In each drawing, the upper element 1 and the lower element 2 are arranged such that they are guided by a first ring member 6. Further, a second ring member 7 is provided on the outside of the first ring member. The upper and lower heater blocks 16 and 17 are heated by cartridge heaters 16a and 17a as heating sources, respectively. Between the upper element 1 and the lower element 2, a raw glass material 4 for a lens to be molded is held. The raw glass material 4 is heated with the heat produced by the heater blocks, and press molded with the pressure applied from either or both of the heater blocks 16 and 17.

In a cooling process after having been heated and press molded, the whole of the lens to be molded must be uniformly cooled. Accordingly, the second ring member made of a material with a lower thermal conductivity than that of the first ring member is provided on the outside of the first ring member. The first ring member material is more easily kept at a uniform temperature by using the same material as that of the mold. A material which is suitable and has a superior thermal penetrability is used for the mold and the first ring member according to the present invention is a super hard alloy containing, as a main component, a tungsten carbide (WC) with a thermal conductivity of 43.2 kcal/mh° C. Also, a cermet consisting mainly of TiN, TiC or $Cr_3C_2$, may be used. Further, any other material may be used if its thermal conductivity is 30 kcal/mh° C. or more. At this time, with the clearance between the outer periphery of the upper and lower elements and the inner periphery of the first ring member made very small to maintain perpendicularity, the optical axis of the optical element to be molded, the center axis of each of the upper and lower elements and the center axis of the first ring member can be made coincident with each other. In order to insulate against heat loss during cooling while using the second ring member, austenitic base stainless steel with a superior heat resistance, such as SUS316 with a thermal conductivity of 13.4 kcal/mh° C. or SUS304 with a thermal conductivity of 14.0 kcal/mh° C., and martensitic base stainless steel such as SUS431 with a thermal conductivity of 17.5 kcal/mh° C. can be used. Further, with the second ring member made longer than the first ring member and with the end faces of the second ring member made mutually parallel, both the resultant lens thickness and the parallelism of the lens surfaces can be predetermined. That is, the second ring member is adapted to be in contact at the end faces thereof with the upper and lower heater blocks in the mold shown in FIG. 3(a), and with flange parts of the upper and lower elements in the mold shown in FIG. 3(b), to thereby predetermine the thickness of the resulting lens. Also, when the clearance between the outer diameter of the first ring member and the inner diameter of the second ring member is excessively wide, the insulation against loss of heat is less effective, so that the clearance should be 5 mm or less, preferably 3 mm or less. The difference between the molds shown in FIGS. 3(a) and (b) is that the mold of FIG. 3(b) has flange parts extending outwardly from the rear surfaces of the upper and lower elements and the mold of FIG. 3(a) does not. Although the mold shown in FIG. 3(b) is usually preferable for purposes of being transferred, the mold shown in FIG. 3(a) is preferable to provide an improved time cycle.

Referring to the drawings, the method and apparatus for molding optical elements using the mold for optical elements according to the present invention will be explained hereinafter.

Figure 4:
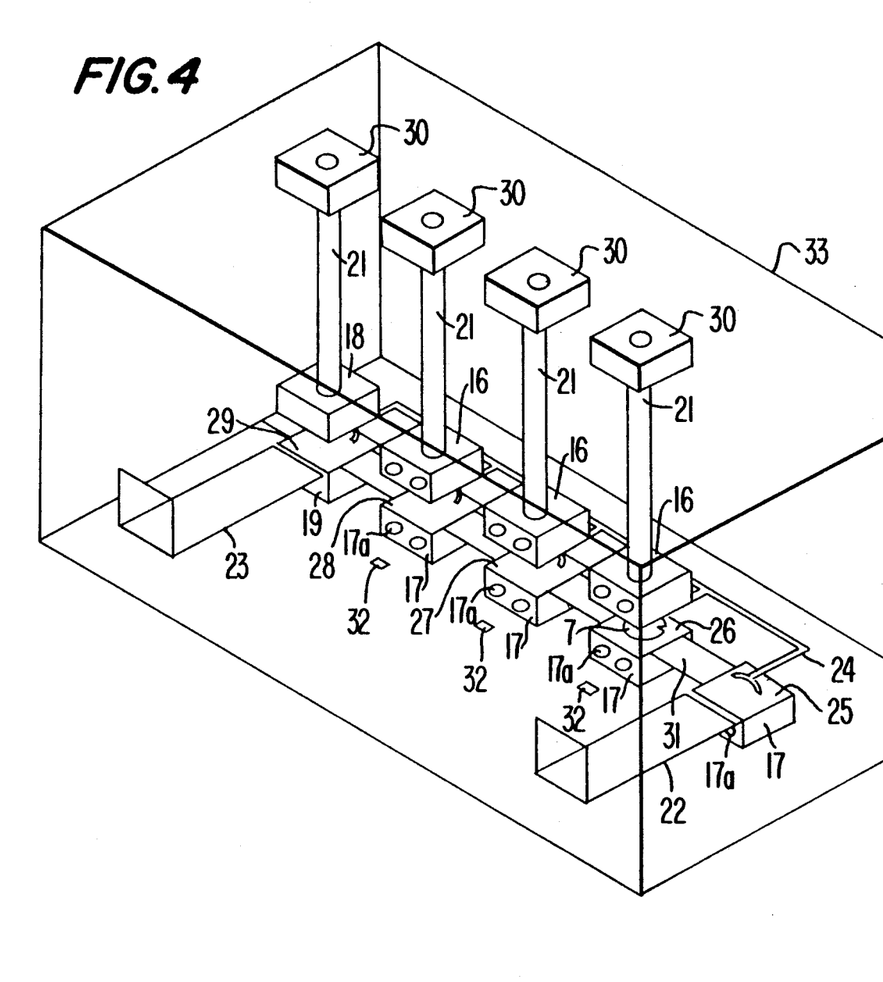
FIG. 4 is a perspective view of a press molding machine used in the present invention.
Figure 5:
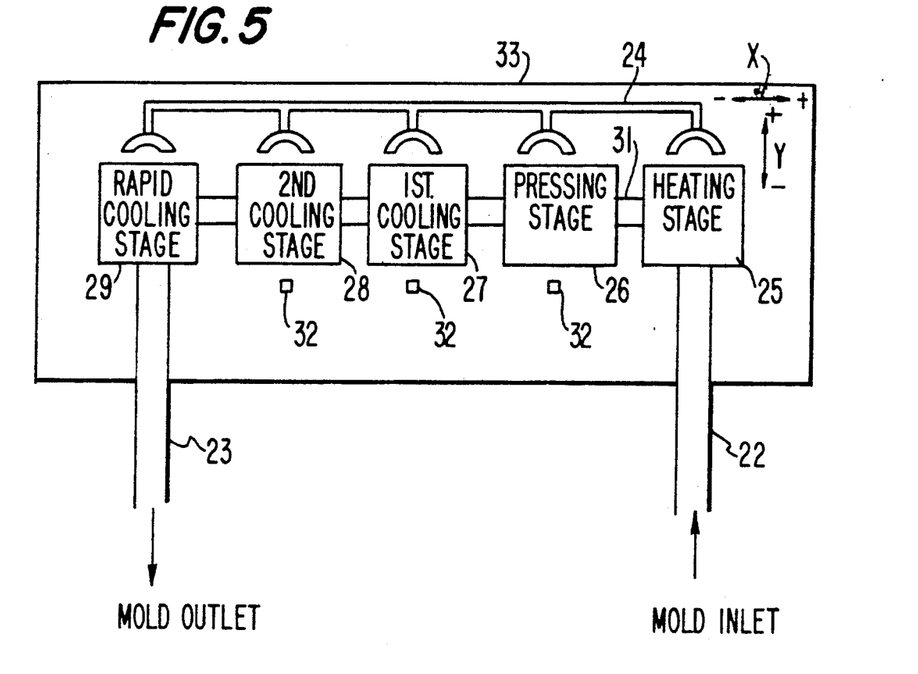
FIG. 5 is a plan view of the press molding machine shown in FIG. 4.
Figure 6:
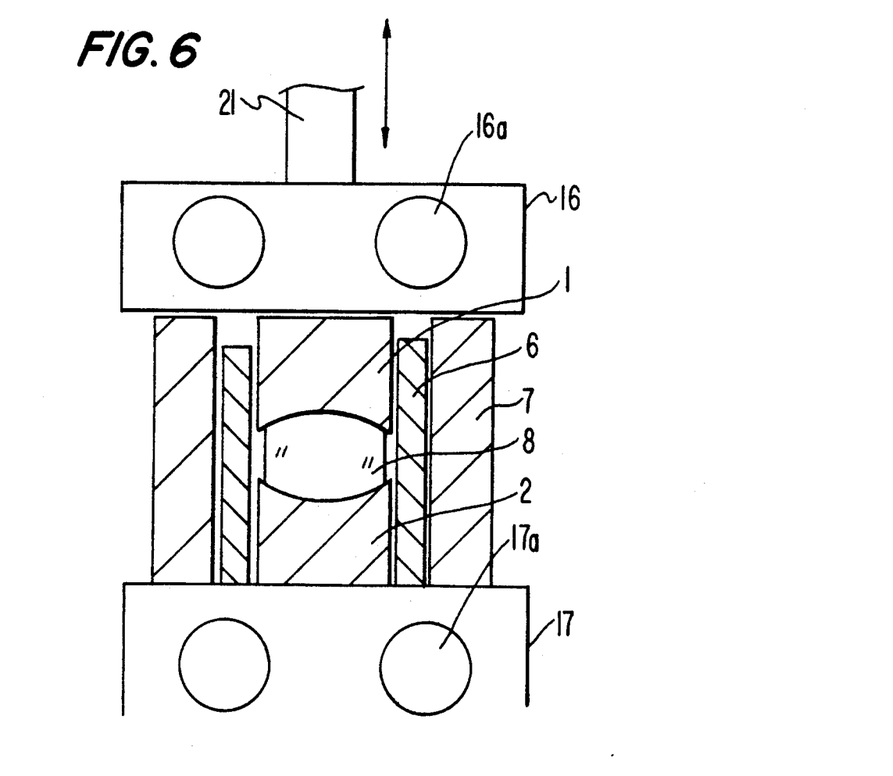
FIG. 6 is a sectional view showing heater blocks and a mold in a first cooling stage used in the present invention.
Figure 7:
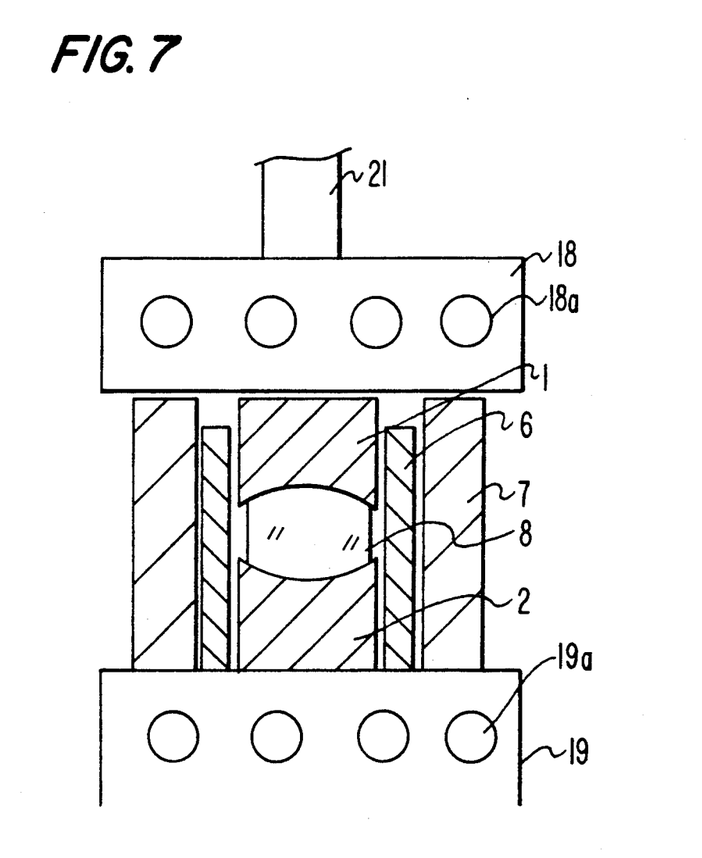
FIG. 7 is a section view of cooling blocks and a mold in a rapid cooling stage according to the present invention.
Figure 8:
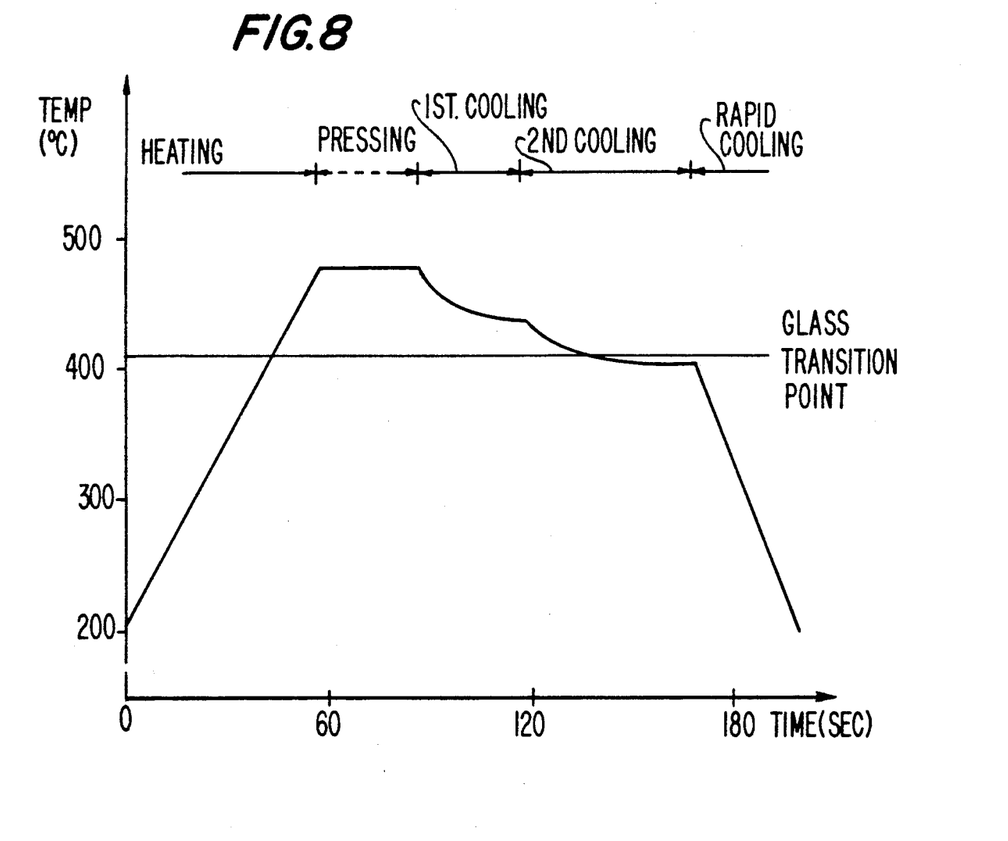
FIG. 8 is a glass temperature profile of the molding method for optical elements according to Example 1 of the invention.
Figure 9:
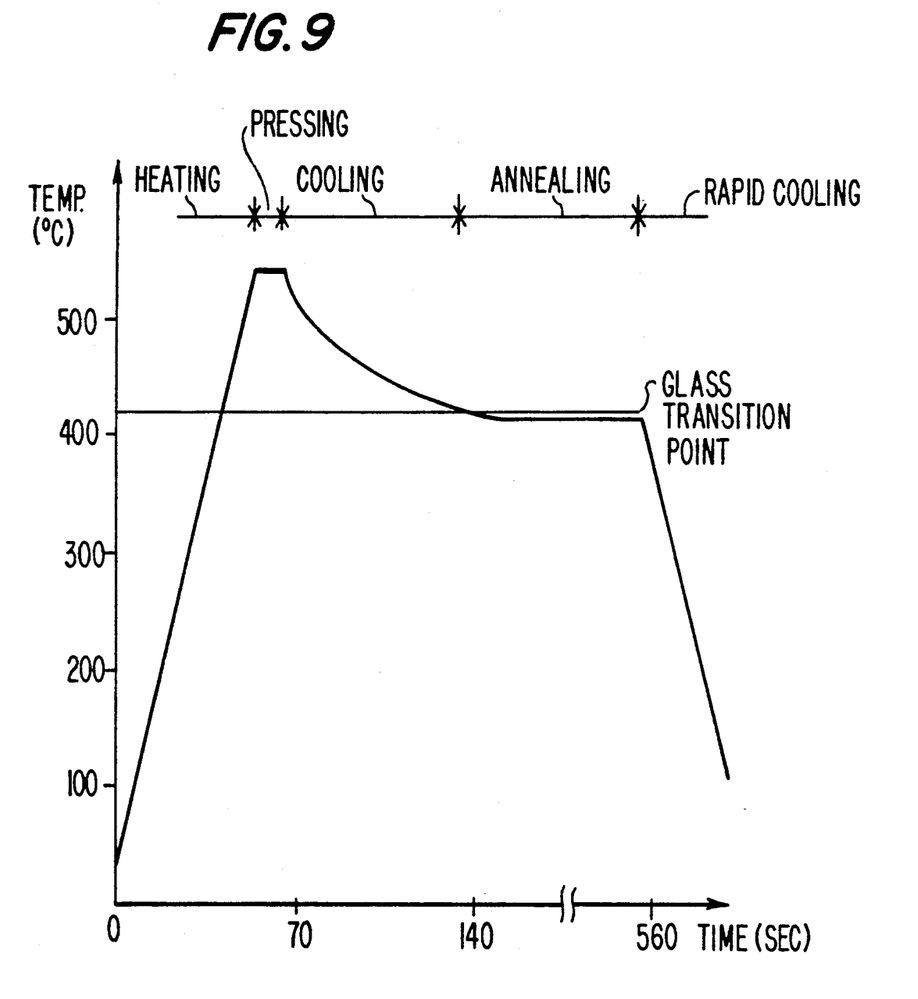
FIG. 9 is a glass temperature profile of the molding method for optical elements according to Example 2 of the invention.
Figure 10:
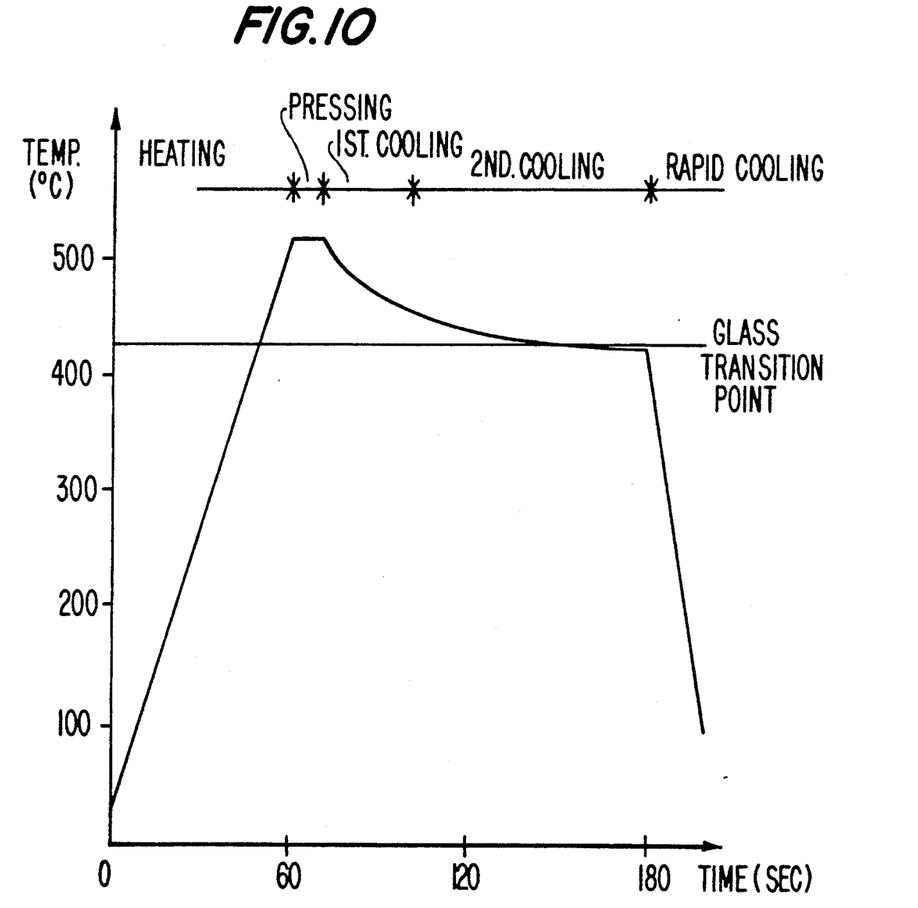
FIG. 10 is a glass temperature profile of the molding method for optical elements according to Example 3 of the invention.

FIG. 4 is a perspective view of a press molding machine used in the present invention, and FIG. 5 is a plan view of FIG. 4. A mold holding a raw glass material with a viscosity of $10^{12}$ poise or more is fed into a mold feeding port, allowed to slide on a feeding rail 22 by a suitable transfer means (not shown), and fed to a heating stage 25. The raw glass material is preferably a glass for molding whose shape is configured by a relational expression $0.02X < Y < 0.8X$ where Y is a difference between the diameter of an optical element to be molded and that of the glass for molding, and X is a movement of the mold. The heating stage 25 and a press stage 26 have been heated to a temperature corresponding to a viscosity of the glass of $10^8$ to $10^{10}$ poise. After the mold has been sufficiently heated, the mold is allowed to slide on a transfer rail 31 by a transfer member 24, and sent to the press stage 26. Then, with a press cylinder 21 lowered by a pressurizing device 30, the mold is pressed by the upper heater block 16 (FIG. 6). Press pressure is sufficient when it can deform the raw glass material for a short time, and is preferably 500 kg/cm² or less. After having been pressed for 30 to 90 seconds, with the press cylinder 21 raised, the mold is transferred to a first cooling stage 27 by the transfer member 24. The first cooling stage 27 is set to a temperature lower than that of the press stage. Although a second cooling stage 28 is provided in this embodiment, in some cases only one stage will be necessary. Accordingly, in a pressed condition after having been transferred to these cooling stages, the mold is cooled at a cooling rate of 1.5° to 2.5° C./sec. for viscosities of $10^{10}$ to $10^{11}$ poise or less and at a cooling rate of 0.2° to 1.5° C./sec. for viscosities of $10^{10}$ to $10^{11}$ poise or more. Finally, the mold whose temperature is at or below the transition point of the glass is transferred to the position between rapid cooling stages 18 and 19 to be cooled (FIG. 7), and is removed via an exit port by a removal rail 23. At this time, any distortions can be removed by feeding the mold to an annealing furnace (not shown) without transferring it to the rapid cooling stages. In a molding chamber 33, nitrogen gas is being blown off through nitrogen gas blow off ports 32, making the inside of the chamber inactive. The transfer member 24 moves such that it moves in the y (−) direction to hold the mold, and moves in the x (−) direction to transfer the mold to the next stage. Thereafter, it moves in the y (+) direction followed by the x (+) direction. With the movement repeated, the whole transferring process can be carried out.

EXAMPLE 1

The molding method for optical elements in the Example was such that molding was performed using the mold shown in FIG. 1(b). The glass material to be pressed was SF3. First, the glass was preheated to 200° C. at a location not shown, fed into a mold at room temperature, and heated to 480° C. (corresponding to a glass viscosity of $10^{8.5}$ poise) in the heating stage. Then, the glass was transferred to the press stage 26, and, with the press cylinder 21 lowered, pressed for 10 seconds. The press time is not particularly important where it does not affect cycle time. The press pressure was 500 kg/cm². Although the press pressure raises no problem even when it is 500 kg/cm² or more, a press pressure of 1000 kg/cm² or more is not preferable because it may effect the highly precise mold shape. Then, after the press pressure had been released, the glass was transferred to the first cooling stage 27. After having been transferred to the first cooling stage 27 which was constantly kept at 435° C., a press pressure was applied to the glass for 22 seconds. At a cooling rate of 1.8° C./sec., the glass was cooled to 440° C. (corresponding to a glass viscosity of $10^{11}$ poise) Then, the glass was transferred to the second cooling stage 28 kept at 400° C., and held for 50 seconds in a pressed condition. At this time, the glass temperature became 405° C. (corresponding to a glass viscosity of $10^{13}$ poise) at a cooling rate of 0.7° C./sec. Then, the glass was rapidly cooled and taken out as a lens. The optical performance of the lens was superior.

EXAMPLE 2

Press molding was performed using the mold shown in FIG. 2(a). The glass material to be molded was SF8. First, the raw glass material was fed into a mold at room temperature, and transferred to the heating stage 25. The glass was heated to 540° C. (corresponding to a glass viscosity of $10^9$ poise) in the heating stage 25. Although a heating temperature corresponding to a glass viscosity of $10^{10}$ poise or less allows formation to be completed in a short time, a temperature corresponding to a glass viscosity of $10^{10}$ poise or more is not preferable because it makes deformation difficult. Then, the glass was transferred to the press stage 26, and, with the press cylinder 21 lowered, pressed for 10 seconds. The press pressure was 100 kg/cm². Then, after the press pressure had been released, the glass was transferred to the first cooling stage 27. After having been transferred to the first cooling stage 27 which was constantly kept at 415° C., press pressure was applied to the glass for 70 seconds. The cooling rate was 2.5° C./sec. for glass viscosities of $10^{11}$ poise or less and 1.5° C./sec. for glass viscosities of $10^{11}$ to $10^{13}$ poise. Thus, after the glass had been pressed to at or below its transition point, the press cylinder 21 was raised. Thereafter, even when the lens, cooled to at or below the glass transition point, is cooled rapidly, the shape accuracy is not affected. However, since the residual distortion is as large as 200 nm/cm due to cooling in a short time, without being transferred to the second cooling stage and the quenching stage, the glass was fed to an annealing furnace by means (not shown) to remove the residual distortion to 4 nm/cm or less. The wavefront aberration of the pressed lens thus obtained was highly precise at RMS=0.028λ. On the other hand, in this case, the first cooling stage was constantly kept at 415° C., so that the glass was not released from the mold, allowing a highly precise pressed lens to be molded. However, when the first cooling stage was constantly kept at 380° C., the cooling rate for glass viscosities of $10^{11}$ poise or less became 2.8° C./sec., and that for glass viscosities of $10^{11}$ to $10^{13}$ poise became 2.0° C./sec. Accordingly, the glass was released from the mold at a viscosity near $10^{11}$ poise, causing no lens performance to be obtained.

EXAMPLE 3

Press molding was performed using the mold shown in FIG. 3(a). The glass material to be molded was SF6. First, the raw glass material was fed into a mold at room temperature, and transferred to the heating stage 25. The glass was heated to 520° C. (corresponding to a glass viscosity of $10^8$ poise) in the heating stage. At this time, although the glass may be heated to a viscosity of $10^8$ poise or more, the heating time becomes long which does not improve lens performance, so that the heating up to a viscosity of $10^8$ poise is sufficient with respect to cycle time. Then, the glass was transferred to the press stage 25, and, with the press cylinder 21 lowered, pressed for 10 seconds. The press pressure was 10 kg/cm². Then, after the press pressure has been released, the glass was transferred to the first cooling stage 27. After having been transferred to the first cooling stage 27 which was constantly kept at 465° C., a press pressure was applied to the glass for 30 seconds. At this time, at the cooling rate of 1.5° C./sec., the glass was cooled to 470° C. (corresponding to a glass viscosity of $10^{10}$ poise). Then, the glass was transferred to the second cooling stage 28 kept at 430° C., and held for 80 seconds in a pressed condition. At this time, the glass became 431° C. (corresponding to a glass viscosity of $10^{13}$ poise), and the cooling rate was 0.5° C./sec. However, an attempt was then made to cool the glass at the cooling rate of 1.0° C./sec. for viscosities of up to $10^{10}$ poise and 0.1° C./sec. for viscosities up to $10^{13}$ poise in order to improve lens performance, with the result that the lens performance was nearly the same and the cooling time for viscosities up to $10^{13}$ poise increased by 300 seconds, causing cycle time to be long and lens cost to be high. The pressed lens thus cooled was transferred to the rapid cooling stage 29, cooled rapidly and taken out. The wavefront aberration of the pressed lens thus obtained was highly precise at RMS=0.025λ. Also, in this case, although the mold had no non-contact part not in contact with the heater block, a pressed lens having a very good lens performance was molded by using the second ring element.

EXAMPLE 4

Using the mold shown in FIG. 1(b), the molding method was also the same as for the Example 1. The shape of the raw glass material used was cylindrical with a diameter of 27 mm and a height of 11 mm. A convex lens was molded with a configuration in which the lens diameter was 30 mm and the thickness at the center portion was 7 mm after having been pressed. Accordingly, the difference between the diameter of the resulting optical element and the diameter of the raw glass material was 3 mm (Y), and the movement of the mold was 4 mm (X), resulting in Y=0.75 X. The wavefront aberration of the pressed lens obtained by this molding method was highly precise at RMS=0.024λ. Using another raw glass material with a diameter of 27 mm and a height of 17 mm, a convex lens was molded with a configuration in which the lens diameter was 30 mm and the thickness at the center portion was 7 mm after having been pressed. Accordingly, the difference between the diameter of the resulting optical element and that of the raw glass material was 3 mm (Y) and the movement of the mold 10 mm (X), resulting in Y=0.3 X. The wavefront aberration of the pressed lens obtained by this molding method was highly precise at RMS=0.030λ.

However, using a glass preform as a raw glass material with a diameter of 29.95 mm and a height of 10 mm, a convex lens was molded with a configuration in which the lens diameter was 30 mm and the thickness at the center portions was 7 mm after having been pressed. Accordingly, the difference between the diameter of the resulting optical element and the diameter of the raw glass material was 0.05 mm (Y), and the movement of the mold was 3 mm (X), resulting in Y=0.016X. The wave front aberration of the pressed lens obtained by this molding method was RMS=0.059λ. Thus, the result was that a highly precise pressed lens was not manufactured. Further, using a ball-shaped raw glass material with a diameter of 19 mm, a convex lens was molded with a configuration in which the lens diameter was 30 mm and the thickness at the center portion was 7 mm after having been pressed. Accordingly, the difference between the diameter of the resulting optical element and the diameter of the raw glass material was 11 mm (Y) and the movement of the mold was 12 mm (X), resulting in Y=0.916X. The wavefront aberration of the pressed lens obtained by this molding method was RMS=0.078λ. Thus, the result was again that a highly precise pressed lens was not manufactured. Thus, where the value of the Y of the raw glass material used exceeds 0.8X, the lens is liable to develop an eccentricity, and where the value is less than 0.02X, it gives poor transferring properties, so that it is preferable to use the raw glass material within that range.

What is claimed is:

1. A mold adapted to be mounted between a pair of heater blocks and to have a pressure applied thereagainst by at least one of the heater blocks for molding a molding material into an optical element, comprising:
   first and second elements, each of which includes an inner molding surface adapted to contact the molding material and an outer surface opposite said inner molding surface and adapted to contact a respective one of the pair of heater blocks, said inner molding surfaces of said first and second elements defining a cavity therebetween in which the molding material is adapted to be received and molded to form the optical elements;

a first ring member mounted about said first and second elements and having means, comprising an inner surface thereof, for guiding vertical movement of said first and second elements; and a second ring member mounted about said first ring member and being formed of a material having a lower thermal conductivity than a material of said first ring member, said second ring member being vertically longer than said first ring member such that said second ring member defines a means for preventing said first and second elements to be moved together beyond a predetermined separation distance so as to predetermine a thickness of the optical element.

2. A mold as recited in claim 1, wherein
said guiding means is operable to predetermine an optical axis of the optical element molded in said cavity.

3. A mold adapted to be mounted between a pair of heater blocks and to have a pressure applied thereagainst by at least one of the heater blocks for molding a molding material into an optical element, comprising:

first and second elements, each of which includes an inner molding surface adapted to contact the molding material, an outer surface opposite said inner molding surface and adapted to contact a respective one of the pair of heater blocks, and a flange extending laterally outwardly from said outer surface so as to extend the surface area which is adapted to contact a respective one of the pair of heater blocks, said inner molding surfaces of said first and second elements defining a cavity therebetween in which the molding material is adapted to be received and molded to form the optical element;

a first ring member mounted about said first and second elements and having means, comprising an inner surface thereof, for guiding vertical movement of said first and second elements; and a second ring member mounted about said first ring member and being formed of a material having a lower thermal conductivity than a material of said first ring member, said second ring member being vertically longer than said first ring member such that said second ring member is adapted to contact said flanges of said first and second elements, respectively, and such that said second ring member defines a means for preventing said first and second elements to be moved together beyond a predetermined separation distance so as to predetermine a thickness of the optical element.

4. A mold as recited in claim 3, wherein
each of said first and second elements and said first ring member comprises a super hard alloy containing tungsten carbide as a main component.

5. A mold as recited in claim 3, wherein
each of said first and second elements and said first ring member comprises a cermet containing one of titanium nitride, titanium carbide and chrome carbide as a main component.

6. A mold as recited in claim 3, wherein
said second ring member comprises an austenitic-based stainless steel.

7. A mold as recited in claim 3, wherein
said second ring member comprise a martensitic-based stainless steel.

8. A mold as recited in claim 3, wherein
a clearance between an outer diameter of said first ring member and an inner diameter of said second ring member is less than or equal to 3 mm.

9. A mold as recited in claim 3, wherein
said guiding means is operable to predetermine an optical axis of the optical element molded in said cavity.

* * * * *